(12) United States Patent
Kobayashi et al.

(10) Patent No.: US 11,855,440 B2
(45) Date of Patent: Dec. 26, 2023

(54) IN-VEHICLE PROTECTION APPARATUS

(71) Applicant: Sumitomo Wiring Systems, Ltd., Yokkaichi (JP)

(72) Inventors: Makoto Kobayashi, Yokkaichi (JP); Yutaka Higuchi, Yokkaichi (JP); Kohei Oshima, Yokkaichi (JP); Ibuki Kawamura, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/654,007

(22) Filed: Mar. 8, 2022

(65) Prior Publication Data
US 2022/0294207 A1 Sep. 15, 2022

(30) Foreign Application Priority Data

Mar. 15, 2021 (JP) ................. 2021-041485

(51) Int. Cl.
*H02H 3/16* (2006.01)
*B60R 16/03* (2006.01)
*H02H 3/14* (2006.01)
*H02H 9/04* (2006.01)

(52) U.S. Cl.
CPC ............... *H02H 3/16* (2013.01); *B60R 16/03* (2013.01); *H02H 3/14* (2013.01); *H02H 9/041* (2013.01); *H02H 9/043* (2013.01)

(58) Field of Classification Search
CPC .......... H02H 9/041; H02H 9/02; H02H 9/043; H02H 9/045; H02H 3/16; H02H 3/14; B60R 16/03
USPC .................................................. 361/56, 91.1
See application file for complete search history.

(56) References Cited

U.S. PATENT DOCUMENTS

2013/0265683 A1\* 10/2013 Gueltig .................... H02H 3/20
361/86
2020/0212664 A1\* 7/2020 Takuma ........... H03K 19/00384

FOREIGN PATENT DOCUMENTS

JP 2010-132070 A 6/2010

\* cited by examiner

*Primary Examiner* — Danny Nguyen
(74) *Attorney, Agent, or Firm* — Honigman LLP

(57) ABSTRACT

A circuit is protected from sudden potential fluctuations that occur in a power ground. An in-vehicle protection apparatus includes a first Zener diode portion, a second Zener diode portion, a diode portion, and an intermediate conductive path. A voltage based on a power source is applied to the anode side of the diode portion. The intermediate conductive path is provided with a branch portion at one end, and forms a path between the cathode of the diode portion and the branch portion. The cathode of the first Zener diode portion is electrically connected to the branch portion and the anode of the first Zener diode portion is electrically connected to a power ground line. The cathode of the second Zener diode portion is electrically connected to the branch portion and the anode of the second Zener diode portion is electrically connected to a signal ground line.

2 Claims, 3 Drawing Sheets

IN-VEHICLE PROTECTION APPARATUS

CROSS-REFERENCE TO RELATED APPLICATIONS

This application claims priority of Japanese Patent Application No. JP 2021-041485 filed on Mar. 15, 2021, the contents of which are incorporated herein.

TECHNICAL FIELD

The present disclosure relates to an in-vehicle protection apparatus.

BACKGROUND

JP 2010-132070A discloses an electric device for an automobile, which includes a control circuit and an output circuit that use a plurality of independent ground lines. The electric device for an automobile disclosed in JP 2010-132070A uses a power system ground line as a ground for an output circuit that handles a relatively large current, and the ground terminal of the control circuit is connected to a signal system ground line.

SUMMARY

When ensuring a power system ground (power ground) in a vehicle, a configuration can be employed in which, for example, wiring that is to be a power ground is connected to a predetermined ground point (e.g., a predetermined part of a body) by a connecting member such as a bolt. However, with such a configuration, if the power ground deviates from the ground point for some reason, there is concern that a sudden potential fluctuation will occur in the power ground.

The present disclosure provides a technique capable of protecting a circuit from a sudden potential fluctuation that occurs in the power ground.

An in-vehicle protection device, which is one aspect of the present disclosure, is an in-vehicle protection apparatus to be used in an in-vehicle system including a power ground line, which is a conductive path electrically connected to a ground portion in a vehicle, and a signal ground line, which is a conductive path that is different from the power ground line, the in-vehicle protection apparatus including: a diode portion with an anode side to which a voltage based on a power source is applied; an intermediate conductive path that has a branch portion provided at one end and forms a path between a cathode of the diode portion and the branch portion; a first Zener diode portion provided between the branch portion and the power ground line; and a second Zener diode portion provided between the branch portion and the signal ground line, in which a cathode of the first Zener diode portion is electrically connected to the branch portion, and an anode of the first Zener diode portion is electrically connected to the power ground line, and a cathode of the second Zener diode portion is electrically connected to the branch portion, and an anode of the second Zener diode portion is electrically connected to the power ground line.

The technique according to the present disclosure can protect the circuit from a sudden potential fluctuation that occurs in the power ground.

DETAILED DESCRIPTION OF PREFERRED EMBODIMENTS

Figure 1:
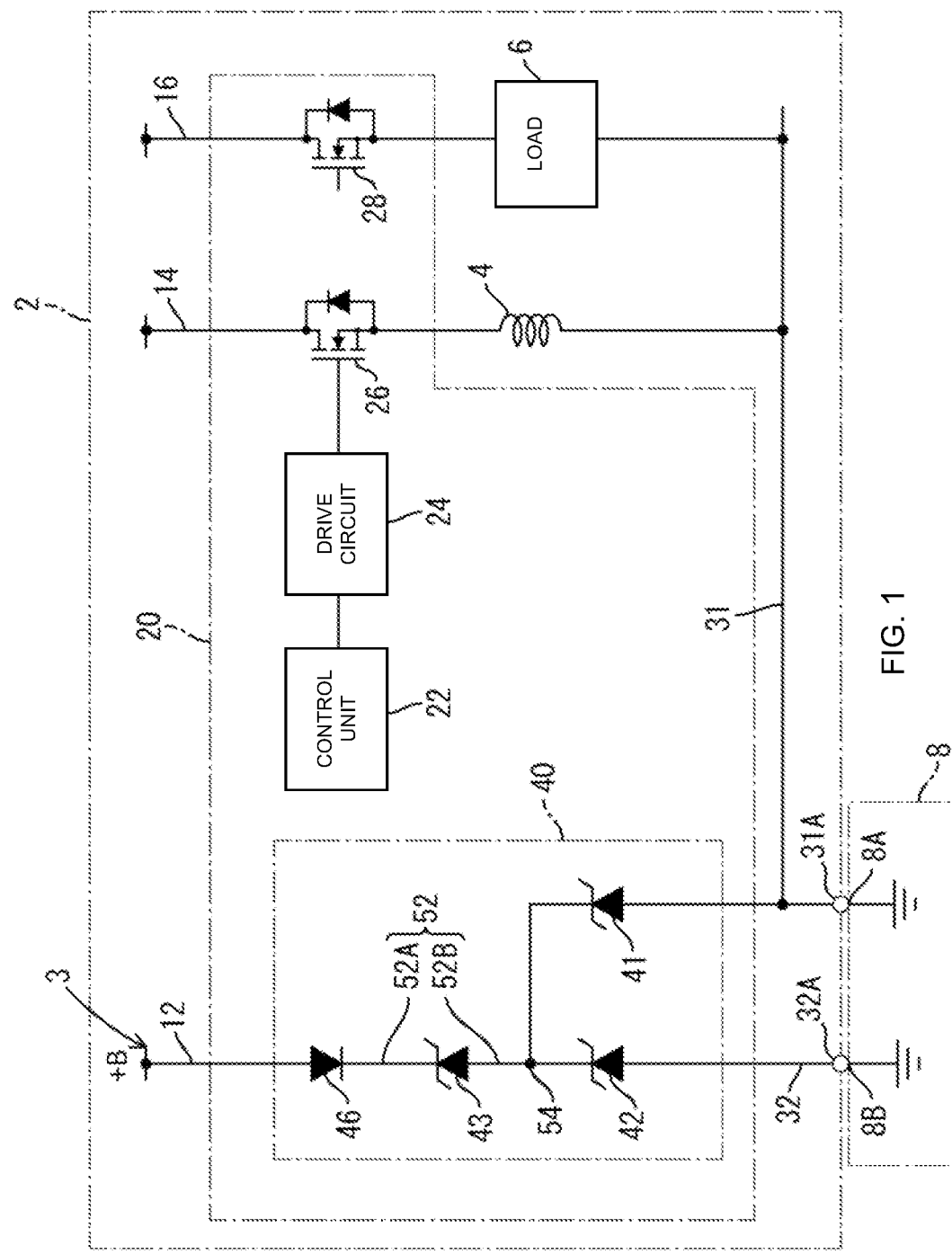
FIG. 1 is a circuit diagram schematically showing an example of an in-vehicle system including an in-vehicle protection apparatus according to the first embodiment.

Hereinafter, embodiments according to the present disclosure are listed and illustrated.

First Embodiment

An in-vehicle protection apparatus to be used in an in-vehicle system including a power ground line, which is a conductive path electrically connected to a ground portion in a vehicle, and a signal ground line, which is a conductive path that is different from the power ground line, the in-vehicle protection apparatus including: a diode portion with an anode side to which a voltage based on a power source is applied; an intermediate conductive path that has a branch portion provided at one end and forms a path between a cathode of the diode portion and the branch portion; a first Zener diode portion provided between the branch portion and the power ground line; and a second Zener diode portion provided between the branch portion and the signal ground line, in which a cathode of the first Zener diode portion is electrically connected to the branch portion, and an anode of the first Zener diode portion is electrically connected to the power ground line, and a cathode of the second Zener diode portion is electrically connected to the branch portion, and an anode of the second Zener diode portion is electrically connected to the power ground line.

In the above-described in-vehicle protection apparatus, when the potential of the power ground line suddenly rises to the extent that the second Zener diode portion breaks down, a current can be allowed to flow to the signal ground line via the first Zener diode portion, the branch portion, and the second Zener diode portion. Accordingly, if a surge voltage is applied to the power ground line, the above-described in-vehicle protection apparatus can protect the circuit by absorbing the surge voltage. Also, in the above-described in-vehicle protection apparatus, when a surge voltage is applied to the power source, both the first Zener diode portion and the second Zener diode portion are broken down, and the current can be allowed to flow through each of the signal ground line and the power ground line from the power source. Thus, the above-described in-vehicle protection apparatus of can protect the circuit from the surge voltage generated in the power source as well. Moreover, the above-described in-vehicle protection apparatus is advantageous in terms of redundancy because the surge voltage can be absorbed through two paths if the surge voltage is applied to the power source. Furthermore, in the above-described in-vehicle protection apparatus, even if the potential of the conductive path 12 becomes lower than the potential of each ground line due to reverse connection of the power source, it is possible to prevent backflow of the current using the diode portions.

Second Embodiment

The in-vehicle protection apparatus of the second embodiment is the in-vehicle protection apparatus according to the first embodiment, further including a third Zener diode portion provided in the intermediate conductive path. A cathode of the third Zener diode portion is electrically connected to the cathode of the diode portion, and an anode of the third Zener diode portion is electrically connected to the branch portion.

In the above-described in-vehicle protection apparatus of the second embodiment, if a surge voltage is superimposed on the power source voltage, the third Zener diode portion is used both when absorption is performed using the path passing through the first Zener diode portion when absorption is performed using the path passing through the second Zener diode portion. Accordingly, the in-vehicle protection apparatus of the second embodiment above has a configuration in which the sizes of the first Zener diode portion and the second Zener diode portion are easily suppressed.

First Embodiment

1. Overview of In-Vehicle System

FIG. 1 shows an in-vehicle system 2. The in-vehicle system 2 of FIG. 1 mainly includes a load drive apparatus 20, loads 4 and 6, and a power source 3. In FIG. 1, the loads 4 and 6 are illustrated as examples of in-vehicle loads, but the in-vehicle system 2 may also be provided with a load other than these.

The loads 4 and 6 are electrical components to be mounted in a vehicle. The load 4 operates by receiving power supplied via a conductive path 14. The load 6 operates by receiving power supplied through a conductive path 16. There is no limitation on the types of the loads 4 and 6. Various known in-vehicle components can be employed as the loads 4 and 6. Each of the loads 4 and 6 may have a plurality of electric components or may be a single electric component. The load 4 is, for example, an inductive load having an inductance component, and is a motor or the like. Although the load 4 is conceptually illustrated using a coil in FIG. 1, the load 4 may also have an electric component other than a coil.

The power source 3 is an in-vehicle battery such as a lead battery that outputs a DC voltage. The power supply 3 keeps the potential of the conductive path 12 at a predetermined value (e.g., 12 V).

The conductive path 12 is a conductive path to which an output voltage is applied from the power supply 3. The conductive path 12 is electrically connected to, for example, a positive electrode of a vehicle-mounted battery constituting the power source 3. The conductive path 12 short-circuits between the power source 3 and an anode of a diode portion 46. The conductive path 12 forms a path for allowing a current to flow toward the ground line when a surge voltage is superimposed on the output voltage of the power source 3.

In the present specification, voltage means a potential difference from the ground potential unless otherwise specified.

The conductive path 14 is a conductive path kept at a predetermined power source potential. For example, the conductive path 14 is kept at a predetermined potential (e.g., 12 V) by the power source 3. The conductive path 14 functions as a path for allowing a current to flow through the load 4 when a switch 26 is in the on state. Note that the conductive path 14 may also be a conductive path to which a DC voltage is applied by a power source that is different from the power source 3.

The conductive path 16 is a conductive path kept at a predetermined power source potential. For example, the conductive path 16 is kept at a predetermined potential (e.g., 12 V) by the power source 3. The conductive path 16 functions as a path for allowing a current to flow through the load 6 when a switch 28 is on. Note that the conductive path 16 may be a conductive path to which a DC voltage is applied by a power source that is different from the power source 3.

A power ground line 31 is a conductive path electrically connected to the ground portion 8 in the vehicle. The ground portion 8 is a portion that is stably kept near the ground potential (0 V) in the vehicle, and is, for example, the body of the vehicle. The power ground line 31 is the ground of a power system. The power ground line 31 is wiring through which current flows from the loads 4 and 6. The power ground line 31 is connected to a first position 8A in the ground portion 8. A terminal 31A provided at an end portion of the power ground wire 31 is fixed to the first position 8A of the ground portion 8 by, for example, a fastening member such as a screw or a bolt.

A signal ground line 32 is a conductive path that is different from the power ground line 31. The signal ground line 32 is connected to a second position 8B in the ground portion 8. The signal ground line 32 is the ground of a control system. The signal ground line 32 is, for example, electrically connected to a control unit 22 and functions as the ground of the control unit 22. A terminal 32A provided at an end portion of the signal ground line 32 is fixed to a second position 8B of the ground portion 8 by, for example, a fastening member such as a screw or a bolt. The potential of the signal ground line 32 can fluctuate independently of the power ground line 31. Conversely, the potential of the power ground line 31 can fluctuate independently of the signal ground line 32.

The load drive apparatus 20 includes an in-vehicle protection apparatus 40, the control unit 22, a drive circuit 24, the switches 26 and 28, and the like. The in-vehicle protection apparatus 40 is also simply referred to as a protection apparatus 40.

The switch 26 is a switch that switches the conductive path 14 between a state in which current flows and a state in which current does not flow. When the switch 26 is on, current flows from the power source (a power source that applies a voltage to the conductive path 14) to the load 4 via the conductive path 14. When the switch 26 is off, no current flows from the above-described power source to the load 4.

The switch 28 is a switch that switches the conductive path 16 between a state in which current flows and a state in which current does not flow. When the switch 28 is on, current flows from the power source (a power source that applies a voltage to the conductive path 16) to the load 6 via the conductive path 16. When the switch 28 is off, no current flows from the above-described power source to the load 6.

The control unit 22 is an information processing apparatus having an information processing function, a calculation function, a control function, and the like. The control unit 22 controls the switching on and off of the switch 26. The control unit 22 can output an on signal for putting the switch 26 in the on state and an off signal for putting the switch 26 in the off state. The control unit 22 may also have a function of controlling the switching on and off of the switch 28.

The drive circuit 24 is a circuit capable of switching between a first voltage signal for putting the switch 26 in the on state and a second voltage signal for putting the switch 26 in the off state. When the control unit 22 outputs an on signal, the drive circuit 24 outputs a first voltage signal, and the switch 26 is kept in the on state. When the control unit 22 outputs an off signal, the drive circuit 24 outputs a second voltage signal, and the switch 26 is kept in the off state.

2. Configuration of In-Vehicle Protection Apparatus

The protection apparatus 40 includes a diode portion 46, a first Zener diode portion 41, a second Zener diode portion 42, and a third Zener diode portion 43.

The diode portion 46 is constituted by a rectifying diode such as a PN junction diode. The diode portion 46 is constituted by one or more rectifying diodes that allow current to flow in the direction from the power source 3 to the third Zener diode portion 43 and do not allow current to flow in the direction from the third Zener diode portion 43 to the power source 3. The diode portion 46 is constituted by, for example, a rectifying diode. A voltage based on the power source 3 is applied to the anode of the diode portion 46. In the example of FIG. 1, the anode of the diode portion 46 is electrically connected to the conductive path 12, and the anode of the diode portion 46 has the same potential as the conductive path 12.

The intermediate conductive path 52 is a conductive path that forms a path through which a current can flow between the cathode of the diode portion 46 and a branch portion 54. The branch portion 54 is provided at one end of the intermediate conductive path 52. The other end of the intermediate conductive path 52 is electrically connected to the cathode of the diode portion 46. The intermediate conductive path 52 includes a first conductive path 52A and a second conductive path 52B. One end portion of the first conductive path 52A is electrically connected to the cathode of the diode portion 46, and the other end portion is electrically connected to the cathode of the third Zener diode portion 43. The first conductive path 52A short-circuits between the cathode of the diode portion 46 and the cathode of the third Zener diode portion 43. One end portion of the second conductive path 52B is electrically connected to the anode of the third Zener diode portion 43, and the other end portion is provided with the branch portion 54. The branch portion 54 is a starting point at which the current branches when a current flows from the power source 3 side to the ground side via the diode portion 46.

The third Zener diode portion 43 is provided between the first conductive path 52A and the second conductive path 52B in the intermediate conductive path 52. The third Zener diode portion 43 is constituted by a known Zener diode. The cathode of the third Zener diode portion 43 is electrically connected to the cathode of the diode portion 46 via the first conductive path 52A. The anode of the third Zener diode portion 43 is electrically connected to the branch portion 54. The anode of the third Zener diode portion 43 is short-circuited to the cathode of the first Zener diode portion 41 via the branch portion 54, and is short-circuited to the cathode of the second Zener diode portion 42 via the branch portion 54.

The first Zener diode portion 41 is provided between the branch portion 54 and the power ground line 31. The first Zener diode portion 41 is constituted by a known Zener diode. The cathode of the first Zener diode portion 41 is electrically connected to the branch portion 54 and is short-circuited to the branch portion 54. The anode of the first Zener diode portion 41 is electrically connected to the power ground line 31 and is short-circuited to the power ground line 31.

The second Zener diode portion 42 is provided between the branch portion 54 and the signal ground line 32. The second Zener diode portion 42 is constituted by a known Zener diode. The cathode of the second Zener diode portion 42 is electrically connected to the branch portion 54 and is short-circuited to the branch portion 54. The anode of the second Zener diode portion 42 is electrically connected to the signal ground line 32 and is short-circuited to the signal ground line 32.

3. Protective Operation Performed by In-Vehicle Protection Apparatus

In the protection apparatus 40, when the potential of the branch portion 54 suddenly rises due to the potential of the power ground line 31 suddenly rising, and the second Zener diode portion 42 breaks down, current can be passed through the signal ground line 32 via the first Zener diode portion 41, the branch portion 54, and the second Zener diode portion 42. Thus, when a surge voltage is applied to the power ground line 31, the protection apparatus 40 can protect the circuit by absorbing the surge voltage.

Figure 2:
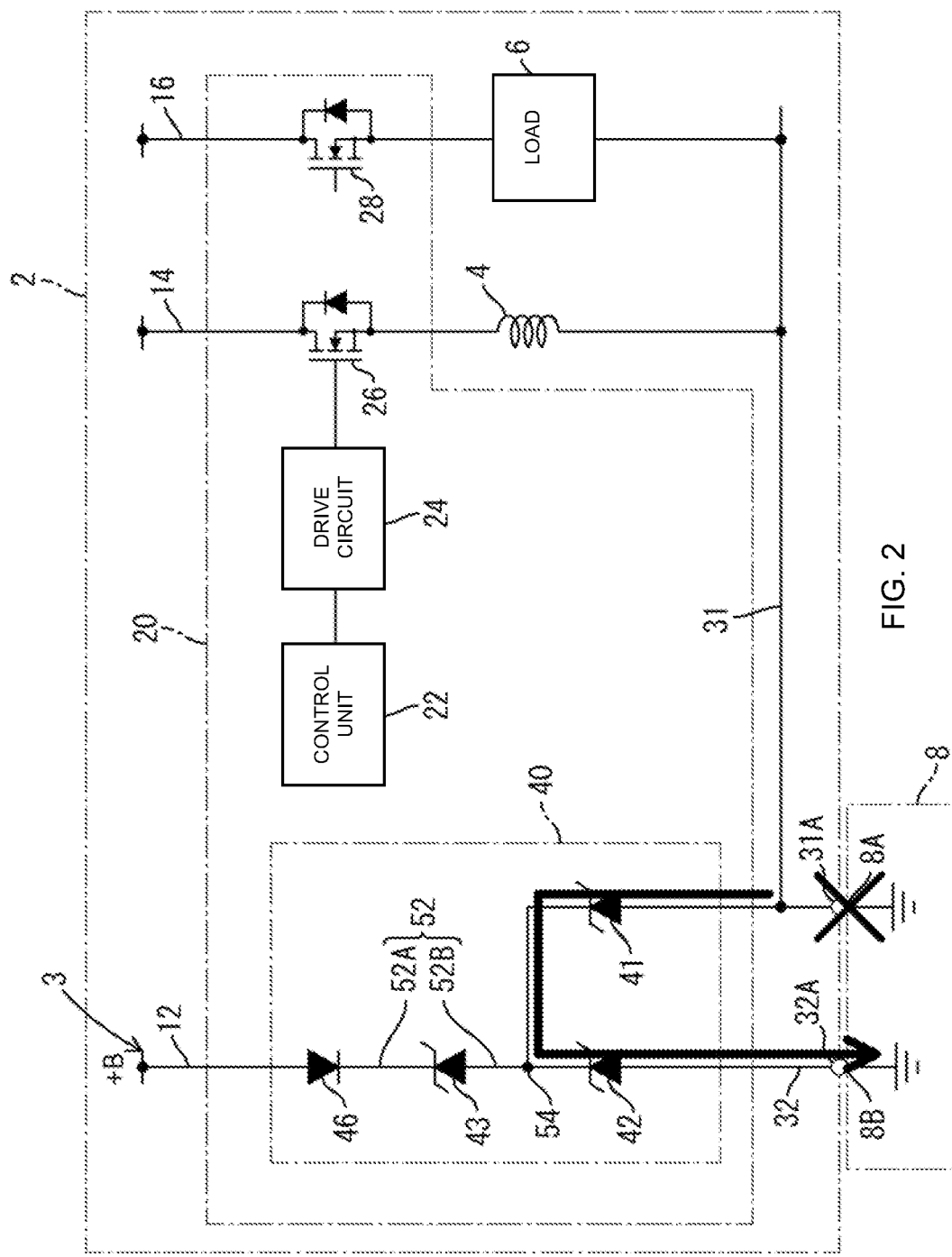
FIG. 2 is an explanatory diagram illustrating an example of operation performed when a terminal of a power ground line has deviated.

For example, in a load 4, which is an inductive load, when the terminal 31A deviates from and is separated from the ground portion 8 while a current is flowing toward the ground portion 8, the flow from the load 4 to the ground portion 8 is suddenly cut off. When such a situation occurs, there is a concern that the potential of the power ground line 31 will rise suddenly. However, in such a situation, the protection apparatus 40 can allow a current to flow as shown in FIG. 2 and return the current caused by the load 4 to the ground portion 8 via the signal ground line 32. Thus, the protection apparatus 40 can prevent the circuit from failing due to the surge voltage applied to the power ground line 31.

Figure 3:
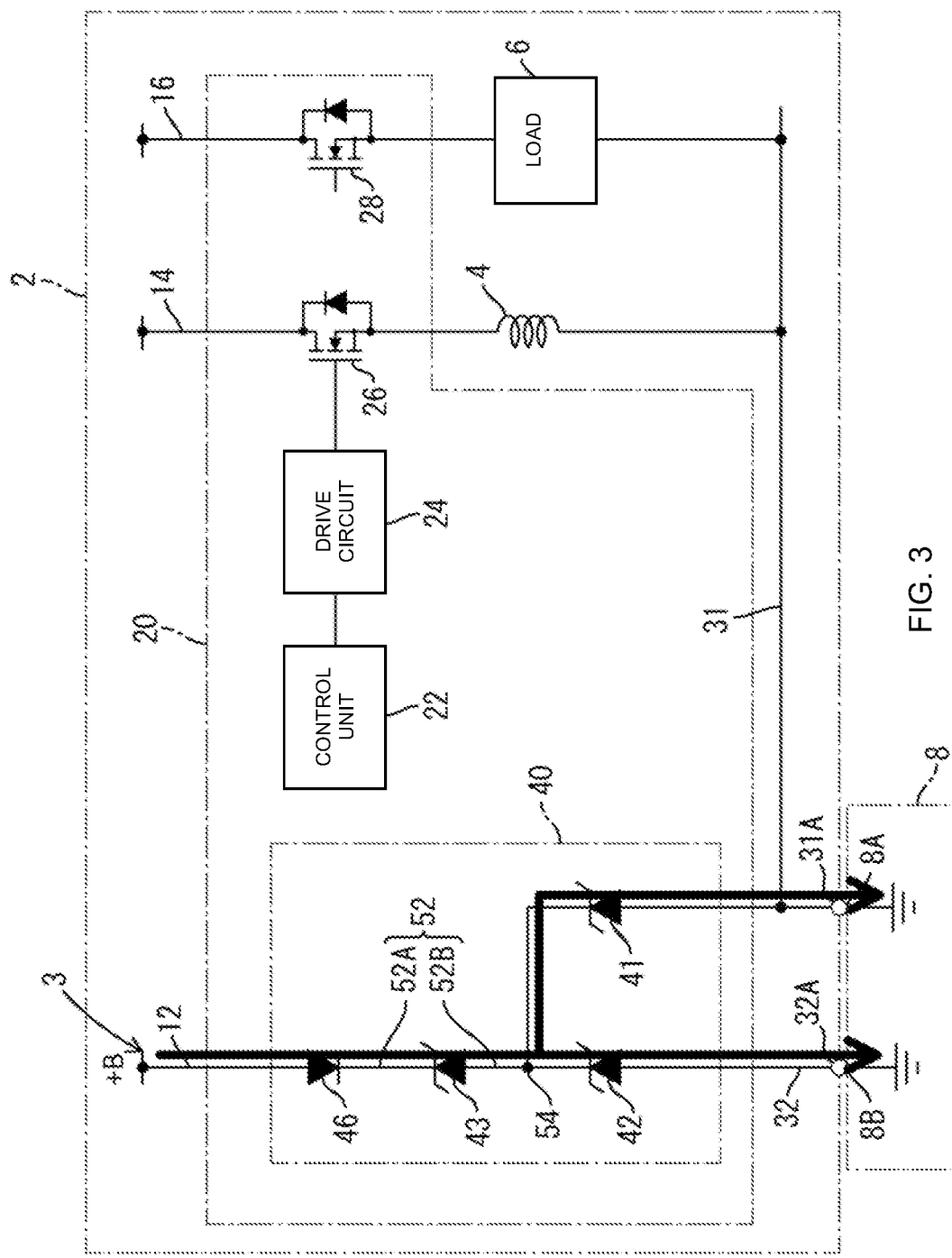
FIG. 3 is an explanatory diagram illustrating an example of operation performed when a surge voltage is applied to a power source.

Also, the protection apparatus 40 can protect the circuit from a surge voltage applied to the power source 3 as well. In this protection apparatus 40, when the potential of the conductive path 12 rises suddenly due to a surge voltage applied to the power source 3 and exceeds a certain value, the first Zener diode portion 41, the second Zener diode portion 42, and the third Zener diode portion 43 all break down, and therefore the current can be allowed to flow from the power source 3 to each of the signal ground line 32 and the power ground line 31 as shown in FIG. 3. Thus, the protection apparatus 40 can prevent the circuit from failing due to the surge voltage applied to the power source 3. Moreover, the protection apparatus 40 is advantageous in terms of redundancy since a surge voltage can be absorbed through two paths when a surge voltage is applied to the power source 3.

In the protection apparatus 40, even if the potential of each conductive path 12 becomes lower than the potential of each ground line due to reverse connection of the power source 3, backflow of the current can be prevented by the diode portion 46.

With the protection apparatus 40, when a surge voltage is superimposed on the voltage of the power source 3, the third Zener diode portion 43 is used both in the case where part of the surge voltage is absorbed by the path passing through the first Zener diode portion 41, and in the case where part of the surge voltage is absorbed by the path passing through the second Zener diode portion 42. Thus, the protection apparatus 40 has a configuration in which the sizes of the first Zener diode portion 41 and the second Zener diode portion 42 are easily suppressed and the number of elements is easily suppressed.

OTHER EMBODIMENTS

The present disclosure is not limited to the embodiments described above with reference to the description and drawings. For example, any combination of the features of the embodiments described above or below is possible as long as there is no discrepancy. Also, any of the features of the embodiments above or below can be omitted unless it is clearly stated as being essential. Furthermore, the above-described embodiment may be modified as follows.

In the first embodiment, a single rectifying diode is illustrated as the diode portion 46, but in the diode portion, a plurality of rectifying diodes may be aligned in the same direction and connected in series in a configuration in which each anode is on the power source 3 side. In this case, the anode of the diode portion refers to the anode of the rectifying diode arranged the closest to the power source 3 among the plurality of rectifying diodes arranged in series, and specifically refers to the anode of the rectifying diode short-circuited to the conductive path 12. When the diode portion is constituted by a configuration in which a plurality of rectifying diodes are connected in series, the cathode of the diode portion refers to the cathode of the rectifying diode arranged the closest to the third Zener diode portion 43 among the plurality of rectifying diodes, and specifically refers to the cathode of the rectifying diode short-circuited to the first conduction path 52A.

In the first embodiment, a single Zener diode is exemplified as the first Zener diode portion 41, but in the first Zener diode portion 41, a plurality of Zener diodes may be aligned in the same direction and connected in series in a configuration in which each cathode is on the branch portion 54 side. In this case, the cathode of the first Zener diode portion 41 refers to the cathode of the Zener diode arranged the closest to the branch portion 54 among the plurality of Zener diodes arranged in series, and specifically, refers to the cathode of a Zener diode that is short-circuited to the branch portion 54. When the first Zener diode portion is constituted by a configuration in which a plurality of Zener diodes are connected in series, the anode of the first Zener diode portion refers to the anode of the Zener diode arranged the closest to the power ground line 31 among the plurality of Zener diodes connected in series, and specifically refers to the anode of the Zener diode short-circuited to the power ground line 31.

In the first embodiment, a single Zener diode is illustrated as the second Zener diode portion 42, but in the second Zener diode portion 42, a plurality of Zener diodes may be arranged in the same direction and connected in series in a configuration in which each cathode is on the branch portion 54 side. In this case, the cathode of the second Zener diode portion 42 refers to the cathode of the Zener diode arranged the closest to the branch portion 54 among the plurality of Zener diodes arranged in series, and specifically refers to the cathode of a Zener diode that is short-circuited to the branch portion 54. When the second Zener diode portion is constituted by a configuration in which a plurality of Zener diodes are connected in series, the anode of the second Zener diode portion refers to the anode of the Zener diode arranged the closest to the signal ground line 32 among the plurality of Zener diodes arranged in series, and specifically refers to the anode of the Zener diode short-circuited to the signal ground line 32.

In the first embodiment, a single Zener diode is illustrated as the third Zener diode portion 43, but in the third Zener diode portion 43, a plurality of Zener diodes may be arranged in the same direction and connected in series in a configuration in which each cathode is on the diode portion 46 side. In this case, the cathode of the third Zener diode portion 43 refers to the cathode of the Zener diode arranged the closest to the diode portion 46 among the plurality of Zener diodes arranged in series, and specifically refers to the cathode of a Zener diode that short-circuits to the cathode of the diode portion 46. When the third Zener diode portion is constituted by a configuration in which a plurality of Zener diodes are connected in series, the anode of the third Zener diode portion refers to the anode of the Zener diode arranged the closest to the branch portion 54 among the plurality of Zener diodes connected in series, and specifically refers to the anode of the Zener diode short-circuited to the branch portion 54.

The embodiments disclosed this time are to be considered exemplary in all respects and not limiting. The scope of the present disclosure is not limited to the embodiments disclosed here, but is indicated by the patent claims, and all modifications within the meaning and scope equivalent to the claims are intended to be encompassed therein.

What is claimed is:

1. An in-vehicle protection apparatus to be used in an in-vehicle system having a control unit, the in-vehicle system including a power ground line, which is a conductive path electrically connected to a first ground portion in a vehicle, and a signal ground line, which is a conductive path electrically connected to a second ground portion in the vehicle, the signal ground line grounding a signal of the control unit, the signal ground line is different from the power ground line, the in-vehicle protection apparatus comprising:
   a diode portion with an anode side to which a voltage based on a power source is applied;
   an intermediate conductive path that has a branch portion provided at one end and forms a path between a cathode of the diode portion and the branch portion;
   a first Zener diode portion provided between the branch portion and the power ground line; and
   a second Zener diode portion provided between the branch portion and the signal ground line,
   wherein a cathode of the first Zener diode portion is electrically connected to the branch portion, and an anode of the first Zener diode portion is electrically connected to the power ground line, and
   a cathode of the second Zener diode portion is electrically connected to the branch portion, and an anode of the second Zener diode portion is electrically connected to the signal ground line.

2. The in-vehicle protection apparatus according to claim 1, further comprising:
   a third Zener diode portion provided in the intermediate conductive path,
   wherein a cathode of the third Zener diode portion is electrically connected to the cathode of the diode portion, and an anode of the third Zener diode portion is electrically connected to the branch portion.

* * * * *